April 24, 1956 W. J. KRODEL ET AL 2,743,178
PROCESS FOR DE-INKING PRINTED WASTE PAPER
Filed July 19, 1948

INVENTORS:
William J. Krodel
Norman Hackerman

United States Patent Office

2,743,178
Patented Apr. 24, 1956

2,743,178

PROCESS FOR DE-INKING PRINTED WASTE PAPER

William J. Krodel, Corpus Christi, and Norman Hackerman, Austin, Tex.; said Hackerman assignor to said Krodel Application July 19, 1948, Serial No. 39,428

2 Claims. (Cl. 92—1.5)

This invention relates to a process of de-inking waste paper, and particularly waste newspaper stock.

Many different processes have been proposed for de-inking waste newspapers so that the paper may be rendered into a pulp for re-use in forming paper or other cellulosic products. These known processes, however, are expensive, laborious, time-consuming and complicated.

Therefore, it is the principal object of the present invention to provide a process for de-inking waste paper that is capable of producing a better result, but, nevertheless, reduces the amount and number of materials employed, the time and cost of operation, and the labor and equipment required.

It is another object of the invention to provide a process for de-inking waste paper that produces a pulp equal in color, brightness and strength to that of the original pulp.

It is a further object of the invention to provide a process for de-inking waste paper that comprises simplicity of organization, economy of requirements, efficiency of operation and superiority of result.

The foregoing objects and others ancillary thereto are preferably accomplished by the present process, which comprises introducing shredded paper into substantially chemically free water, adding a suitable detergent to loosen the ink binder and emulsify the ink particles, adding a salt which will charge the cellulose and ink particles at like polarities but to a decidedly different extent to effect at least a partial separation of the ink from the cellulose, heating and agitating the suspension to bring about the separation induced by the salt, then directing an electric current through the suspension to increase the separation of the cellulose and ink particles, then removing from the cellulose fibers the water, and with it the emulsified ink particles, and thereafter washing, acid bleaching, and again washing the pulp.

According to the present invention, the de-inking process is adapted to produce de-inked newspaper stock of such quality that said stock may be re-used for newsprint, for the making of rayon, or for other purposes wherein a clean cellulose pulp is employed.

Figure 1:
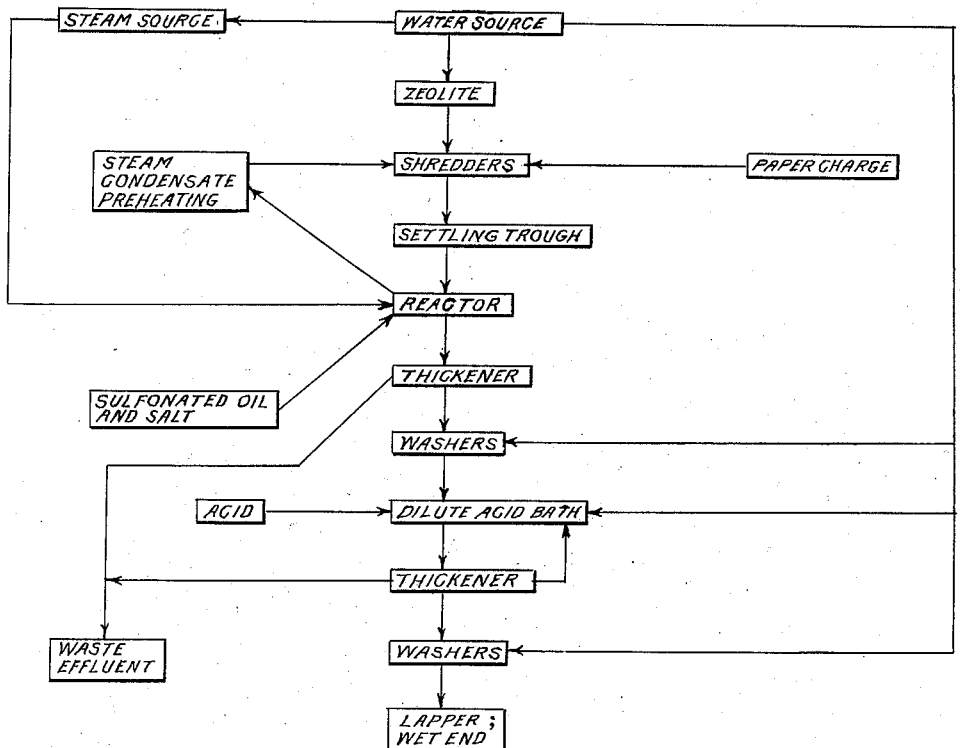
Figure 1 is a flow sheet diagramming the process according to the invention.

The process, as illustrated by the flow sheet of Figure 1, begins with shredding the waste paper, particularly waste newsprint, which may be accomplished by any of the several methods now used in the paper industry for a batch cooking process. The paper is first freed of objectionable trash, if found to be present. The process will be expedited by shredding to small particle sizes.

Water is then added to the shredded paper to form a mixture having a stock consistency not less than one percent. The water used throughout the process must be substantially free from impurities, and, if necessary, should be subjected to a zeolite treatment, or to any one of a number of methods designed to remove most effectively impurities from water.

The paper-water mix is then passed through a settling trough where any foreign matter present can be removed. Thereafter, the paper-water mix may be thickened, having a stock consistency of from one to four percent by weight, and preferably in the neighborhood of 1.5%. This paper stock is then fed into the reactor.

A detergent is then added to the paper-water mix. For soft water, the detergent is added preferably to the amount of 1% of the weight of the paper, although from 0.25–5.0% detergent based on the dry weight of the paper may be used. For hard water, additional detergent may be added to offset the effects thereof. It must be of such a character that, at the temperature maintained, it will remain completely dispersed entirely through the mix and will not rise to the surface to cause or aid foaming at any temperature within the range employed. The detergent serves two purposes; namely, to loosen the ink binder, and to emulsify the ink particles after their separation from the paper so that the ink particles will be separated from the pulp by washing.

One example of a suitable detergent is C-cetyl betaine, an internal quaternary ammonium salt of amino acid derivative of cetyl alcohol. Other detergents, such as sulfonated esters of $C_{16}$–$C_{18}$ alcohols might be used, as well as amino acid derivatives of such alcohols. In general, any organic chemical which will tend to suitably suspend ink particles in a water solution of paper at a temperature not over 195° F. or under 150° F. may be used.

It has been found, according to the invention, that pulp and ink particles acquire electrostatic charges in certain aqueous electrolyte solutions, and therefore, a suitable salt is then added to the mixture in such amounts that it will cause the cellulose and ink particles to acquire electrostatic charges of like sign, but differing greatly in magnitude. The type and extent of charge on the particles are functions of the nature and concentration of the electrolyte. When unlike charges are induced, bonding of the ink to the cellulose fibers occurs and their separation is not accomplished.

Therefore, the particles must possess like charges of different magnitude, and to operate effectively, the magnitude of the charges must differ greatly. It is the purpose of this process to use any one of a number of suitable salts in such an amount that the electrostatic relation between the particles will become repellent in nature. It has been found, as a feature of the invention, that in electrophoretic experiments with cellulose fibers and ink particles in different aqueous electrolyte solutions at different concentrations, that highly repellent charges could be induced to thereby bring about a separation of the ink from the cellulose. The cellulose fibers generally acquired small positive or negative charges in the same systems in which the ink particles acquired highly positive or negative charges.

After the salt has been added to the paper-water mix containing the detergent, the slurry is agitated and heated for a period of from ½ to 2 hours, generally for one hour. The mix should be kept at a temperature of from 150–190° F. and should be at atmospheric or slightly elevated pressure. In this defibering and cooking operation, the ink particles are repelled from the cellulose fibers, and these ink particles then become emulsified by the detergent, and for this reason remain in the water apart from the cellulose fibers.

Any salt that will produce charges on the fiber and the ink particle which are widely different in magnitude can be used. In general, the salt that is employed may be one that will ionize so that tervalent or higher valent ions are formed, and those used in this process are those which give ions of a valence of three or greater. Compounds of either the rare earth elements or of the more common elements can be used. For example, such a salt could be any one of the following: $Na_4P_2O_7$, $Na_3PO_4$, $Na_6(PO_3)_6$, $Ce(NO_3)_3$, $Th(NO_3)_3$, $Th(NO_3)_4$, or $K_4Fe(CN)_6$. By the use of such salts, highly repellent charges can be induced in the ink particles and cellulose fibers, the effect being based on electrophoretic phenomena.

In selecting the salt to be used to impart the electrostatic charges to the ink particles and cellulose fibers, and to determine the quantity of this salt to be used, the zeta potential resulting from this salt is measured. This is based upon the widely accepted theory that a double layer exists at the solid-liquid interface of solids in an electrolyte. This theory postulates a layer fixed to the solid which is only a single ion in thickness and across which there is a sharp potential drop; and a second diffuse layer containing an excess concentration of ions opposite in charge to that on the surface of the solid. The effective charge upon the solid appears to be due to the potential across this diffuse second layer.

On supplying an electrical field to such charged solid particles suspended in an electrolyte, the particles move with respect to the electrolyte and the rate is a measure of the potential drop between the liquid and the fixed layer. This potential drop is referred to as the zeta potential and by measuring the rate of movement of such a charged solid particle in an electrolyte, the zeta potential of that solid is determined for the particular electrolyte at that concentration. In this manner, the zeta potential of the ink particles and the zeta potential of the cellulose fibers can be measured for different salts at different concentrations. A comparison of these results will show whether a sufficiently great zeta potential difference will exist between the ink particles and cellulose fibers to make their separation practical in this medium.

The experiments leading to this invention showed that for practical considerations, the zeta potential of the ink particles is represented by the equation:

$$\zeta \text{ ink particles} = \frac{6\pi\mu\eta}{HD}$$

and that the zeta potential of the cellulose fibers is represented by the equation:

$$\zeta \text{ cellulose fibre} = \frac{4\pi\mu\eta}{HD}$$

where
$\mu$ represents the velocity of the solid
$\eta$ represents the viscosity of the electrolyte
$H$ represents the potential gradient between the electrodes
$D$ represents the dielectric constant of the medium the values for the symbols are such that $\zeta$ is measured in terms of millivolts.

Since the electrolyte solutions used are dilute, it is practical to use the values of $\eta$ and $D$ for bulk water at the same temperature in making the calculations. The equipment to be used for measuring the mobility of the ink particles and cellulose fibers may conveniently be that described in the article Bendien and Janssen, Recueil des Travaux Chimiques, 46, 739 (1927). The procedure outlined in this article may be followed and the data obtained may be substituted in the above equations to calculate the zeta potentials of the ink particles and the cellulose fibers.

As these experiments and calculations may be easily conducted, a determination can be made in a short time as to whether the salt, at a certain concentration, will produce the desired difference in zeta potentials of the ink particles and cellulose fibers. It is desirable that the salt and its concentration which is used give the greatest possible difference between the zeta potentials, as this will effect a more rapid and more thorough separation between the ink particles and the cellulose fibers. For example, potentials of $-80$ millivolts and $-8$ millivolts respectively, or of plus 80 and plus 8 millivolts will effect an excellent separation. Likewise, potentials of $-40$ millivolts and $-4$ millivolts respectively, or of $+40$ and $+4$ millivolts, will effect a rapid and effective separation. To obtain satisfactory results from a practical standpoint, zeta potential of the one should be at least four times greater than the zeta potential of the other, and there appears to be no maximum difference.

Figure 2:
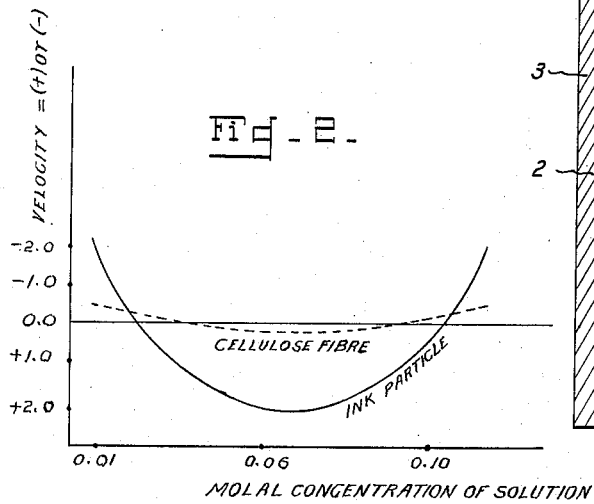
Figure 2 is a graph illustrating the charging of the cellulose fibers and ink particles by the use of a specific salt.

For example, employing $Na_3PO_4$ as an illustration and referring to Figure 2, at a certain salt concentration, the sodium (Na) ion may be adsorbed in preference to $PO_4\equiv$ion or vice versa, and the cellulose may have a small negative electrostatic charge, while the ink particle may have a large negative electrostatic charge. If the charges are close together or opposite in nature, as for instance, cellulose $+$ or $-8.0$ millivolts and ink $+$ or $-10.0$ millivolts, the separation of the particles is not feasible. However, de-inking occurs when the charges are of the same sign but far apart, as for instance, cellulose $+$ or $-8.0$ millivolts and ink $+$ or $-80.0$ millivolts. Referring to Figure 2, it will be seen that, according to this graph, the best de-inking range for $Na_3PO_4$ would be in the range of 0.06 molal concentration. During the cooking period, the mixture is continually agitated to effect defibration of the paper stock. As the cooking and agitating proceeds, some of the ink particles and any other foreign matter are separated from the fibers and are emulsified, forming a scum which rises to the top of the mixture. The cooking is stopped when no further apparent visible change in appearance in the stock suspension occurs. At this point, the water in the mixture should be highly discolored because of the presence of dirt from the paper stock and from the emulsified ink particles suspended in solution.

When the cooking process is completed, the scum is removed from the top of the mixture and electrodes are immersed in the mixture while the agitation is continued. Preferably, the electrode of polarity opposite to that of the ink particles has a large surface area. An electric current is passed between the electrodes for a period not exceeding thirty minutes or until the separation of the ink particles from the cellulose fibers substantially ceases. A period of about ten to fifteen minutes will ordinarily suffice, although this will of course depend upon the impressed voltage.

The amount of current passed between the electrodes is necessarily small, the voltage drop across the electrodes being the important factor. In actual use, a voltage drop of approximately 1.8 to 2.4 volts per inch was found to be most efficient. The voltage must be limited so that little electrolysis occurs but must be sufficient to effect separation of the ink particles which still remain close to the fibers after the cooking phase. In connection with the electrical treatment, the turbulence of flow for the mix is such that no net migration of the cellulose fibers occurs.

The impressed voltage appears to cause an enforced diffusion process by which the ink particles are impelled away from the cellulose fibers. The detergent loosens the ink binder and emulsifies any ink particles separated from the paper fibers. The ink and cellulose particles develop highly repellent charges through the adsorption of ions from the salt solution and thereby escape the electrostatic bond of the ink-fiber combination. The electric current effects further separation due to the difference in mobility between the particles. As the ink particles are separated, most of them are covered by the emulsifying agent and are thereby prevented from re-coalescing with the fibers, while the remainder migrate to the electrode where their charge is neutralized, and coagulation occurs. Emulsification of the coagulated particles follows, and they are dispersed throughout the solution.

After the electrical treatment, the scum is again removed and thereafter the water is drained away from the cellulose fibers. It is important to here observe that it is not essential to the practice of the invention that the electrical treatment be used. It will often be found that because of the nature of the ink particles or the paper stock, or both, that the cooking and agitating treatment will alone be effective to sufficiently separate the ink particles from the paper fibers. If at the end of the heating step an inspection shows that an undesirable amount of ink remains adhering, the electrical treatment can then be used to effect a final and more complete separation.

Upon completion of the cooking step or of the electric treatment, if the latter is used, the liquid, or "dirty-water" is drained from the pulp which is then washed repeatedly until the ink particles have been substantially removed from the pulp. The pulp or stock is then immersed in an acid bath which removes any adsorbed ions that discolor the fibers and a definite degree of brightness is obtained thereby. Whereas an alkaline bath causes yellowing, it has been found that an acid bath is highly effective. Any acids may be employed, for example, chlorine in water, dilute hydrochloric acid or dilute acetic acid, the degree of dilution of the acid bath being determined by the effectual removal of the adsorbed ions. The stock is thickened and rinsed immediately after the acid bath, as otherwise, the removed ions may be re-adsorbed again by the fibers. The stock is then diluted to a suitable consistency preparatory to going on the wet end of a paper making machine.

Figure 3:
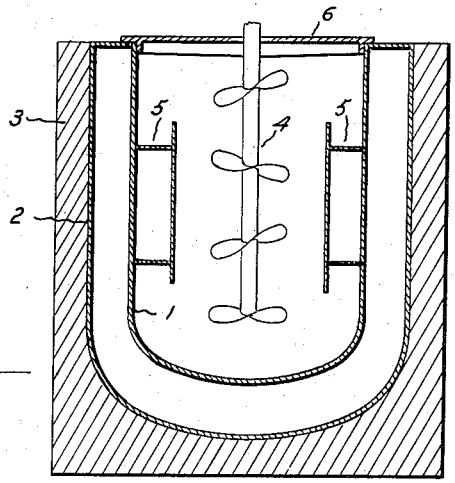
Figure 3 is a diagrammatic illustration of a suitable reactor apparatus.

A suitable apparatus for carrying out the de-inking process is illustrated in Figure 3. The receptacle 1 is surrounded with a jacket 2, through which steam is passed to maintain the contents of the receptacle at the desired elevated temperature. To conserve steam, a layer of insulation 3 is disposed on the outside of the steam jacket. It will be apparent that the receptacle 1 may be heated directly by a flame or hot gases, if desired.

Within the receptacle is a vertical stirrer 4 and this may have any appropriate shape which will agitate the contents, as, for example, it need not be of the rotary type shown. It is preferable that baffle plates 5 be attached to the interior of receptacle 1 to assist the agitating action. A cover 6 should be provided to retain heat in the receptacle.

The stirrer 4 should be made of metal so that it can serve as one electrode for the electric current. The other electrode may be either one or more of the baffles 5 or may be the receptacle itself if made of metal. Suitable electrical connections may be made to these electrodes.

In carrying out the process, water is first poured in the receptacle and then the shredded paper is added. Thereafter the detergent and then the selected salt is added. After agitation by stirrer 4 and the supply of heat by steam jacket 2 has been maintained for a proper period of time, the stirrer 4 is stopped and the scum is removed. If the use of electric current to effect further separation appears necessary, the electrical connection to the electrodes is made and the movement of the stirrer is continued. At the end of the designated time, the current and stirrer are stopped, the water is drained off, and the pulp is recovered.

Instead of utilizing the same receptacle for the entire processing, it will be understood that the separate steps of defibering, cooking and electrical treatment may be carried out in separate receptacles, or a conjunction of treatments may be employed, each treatment or treatments most suitable for each step.

As examples of the process, the following procedure was followed. The de-inking was carried out in batch lots using for each batch 12 liters of distilled water, 200 grams of waste newspaper, 2 grams of a sulfonated ester of a mixture of $C_{16}$-$C_{18}$ alcohols and a suitable salt. The water was added to the kettle first, then the hand-shredded waste newspaper, the detergent, and finally the salt. The table below lists the type of salt, the quantity added, and the type of treatment undergone by the waste newspaper in each experiment.

| Experiment | Salt | Quantity (grams) | Type of Treatment |
|---|---|---|---|
| 1 | $Na_4P_2O_7$ | 8.0 | Cooking and agitation. |
| 1-A | $Na_4P_2O_7$ | 8.0 | #1 plus 45 volt D-C. |
| 2-A | $K_4Fe(CN)_6$ | 21.1 | Cooking and agitation. |
| 2-B | $K_4Fe(CN)_6$ | 21.1 | #2A plus 45 volt D-C. |
| 2-C | $K_4Fe(CN)_6$ | 21.1 | #2B plus dilute acid. |
| 3-A | $Na_6(PO_3)_6$ | 19.0 | Cooking and agitation. |
| 3-B | $Na_6(PO_3)_6$ | 19.0 | #3A plus 45 volt D-C. |
| 3-C | $Na_6(PO_3)_6$ | 19.0 | #3B plus dilute acid. |

The temperature of the mixture was regulated by the quantity of steam allowed to pass through the jacket of the kettle, and varied from 75° to 90° centigrade. After cooking for one hour, with stirring, the pulp was strained and washed on a 45 mesh wire screen.

In several experiments a D. C. voltage was impressed across the mixture in the kettle by immersion of suitable electrodes. A 45 volt B battery was used as the source.

Handsheets were made by using a suction flask with a large Buchner funnel. The washed pulp was diluted and measured out in the quantities necessary to form a handsheet of a desired density. The paper pulp suspension was poured over filter paper placed in the funnel where it formed a webbed mat as the water was carried away by suction filtration. The mat was then lifted out and pressed between sheets of blotter paper. Five handsheets were made from each experimental batch. In some cases, the washed pulp was immersed in dilute acid to remove discoloration produced by adsorption of certain ions, rewashed, and formed into handsheets.

In order to provide a basis of comparison for the handsheets, the following method was devised. A 200 watt, 115 volt Mazda projection lamp was used as a source of illumination. The light was focused on the handsheets which were 120 centimeters distant. The intensity of the incident beam at an angle of 35° from the normal gave a reading of 270 foot candles on a Weston Photronic Foot Candle Meter. The beam reflected from the handsheet was measured at an angle of 60° from the incident beam.

The readings in foot candles thus obtained give the magnitude of reflectance from a 200 watt projection lamp at a distance of 120 centimeters. All readings are in foot candles. The reflectance for unused smooth newsprint was 148 foot candles.

| Experiment | Readings | Average Reading |
|---|---|---|
| 1 | 140-136-137-136-137 | 137 |
| 1-A | 140-140-138-138-139 | 139 |
| 2-A | 127-130-123-127-126 | 127 |
| 2-B | 130-133-130-132-134 | 132 |
| 2-C | 135-135-131-134-135 | 134 |
| 3-A | 135-140-135-136-137 | 137 |
| 3-B | 139-140-132-135-135 | 136 |
| 3-C | 141-141-142-145-146 | 143 |

The brightness tests on these experimental handsheets gave the following results:

| Handsheet | Readings | Average |
|---|---|---|
| 2-A | 46.3—45.8 | 46.0 |
| 2-B | 46.2—46.2 | 46.2 |
| 3-A | 50.4—51.4 | 50.9 |
| 3-B | 52.1—51.6 | 51.8 |
| 3-C | 52.7—51.8 | 52.2 |

Average G. E. Brightness of 1=2.76 foot candle readings obtained experimentally for the handsheets.

The average brightness for handsheets obtained from unprinted newspaper is 52.2 and it will therefore be seen that the results obtained by the invention compare quite favorably with new paper stock.

It is appreciated that slight variations in the conditions described herein might become necessary to carry out the invention when using the process in different localities and in different-sized operations, and these departures are intended to come within the scope of the appended claims. For example, the salt concentration must be adjusted to local conditions, the purity of the salt, and the nature of the wood pulp and its manufacture into newsprint. In different localities, the water supply will receive different purifying treatments and will contain local minerals, and these factors will affect the process to some extent.

What we claim is:

1. The process of de-inking printed material which comprises forming an aqueous slurry of printed and shredded waste newsprint stock material, then adding to the slurry a water soluble salt yielding an ion having a valency of at least 4, to thereby induce a zeta potential of the same charged sign as the ink particles and which differs from that of similarly charged particles of the material by a factor of at least 4, to thereby effect a substantial separation of the ink particles from the material particles; then adding to the resultant mass a detergent of a suitable type to emulsify the separated ink particles and retain them in suspension and separated from the material particles; then subjecting such mass to a temperature of 150–190° F. for a period of ½–2 hours and agitating the mass during said period; and then removing the separated ink particles from the slurry and mass with the water.

2. The process of de-inking printed material which comprises forming an aqueous slurry of printed and shredded waste newsprint stock material, then adding to the slurry a water soluble salt yielding an ion having a valency of at least 4, to thereby induce a zeta potential of the same charged sign as the ink particles and which differs from that of similarly charged particles of the material by a factor of at least 4, to thereby effect a substantial separation of the ink particles from the material particles, then adding to the resultant mass a detergent of a suitable type to emulsify the separated ink particles and retain them in suspension and separated from the material particles; then subjecting such mass to a temperature of 150–190° F. for a period of ½–2 hours and agitating the mass during said period; then applying to electrodes in contact with such mass an imposed electric potential difference approximating 1.8 to 2.4 volts per inch of linear distance between said electrodes, and without permitting electrolysis and to substantially complete the separation of the ink particles from the material fibers; and then removing the separated ink particles from the slurry and mass with the water.

References Cited in the file of this patent

UNITED STATES PATENTS

| | | |
|---|---|---|
| 1,008,779 | Bonser | Nov. 14, 1911 |
| 1,925,372 | Darling | Sept. 5, 1933 |
| 1,933,228 | Snyder et al. | Oct. 31, 1933 |
| 1,988,363 | Snyder | Jan. 15, 1935 |

FOREIGN PATENTS

| | | |
|---|---|---|
| 506,472 | Great Britain | May 30, 1938 |

OTHER REFERENCES

Ellis: Printing Inks, published by Reinhold Pub. Corp., New York (1940), pp. 480–483.

Deinking of Paper by West, published by Institute of Paper Chemistry, Appleton, Wis. (April 1943), pp. 5–9, 27, 32–34, 43.